(12) United States Patent
Geringer et al.

(10) Patent No.: US 11,155,991 B2
(45) Date of Patent: Oct. 26, 2021

(54) MULTI USE TRAFFIC WARNING AND SHELTER APPARATUS

(71) Applicants: Jacob Geringer, St. Charles, MO (US); Adam Thoroughman, St. Charles, MO (US)

(72) Inventors: Jacob Geringer, St. Charles, MO (US); Adam Thoroughman, St. Charles, MO (US)

( * ) Notice: Subject to any disclaimer, the term of this patent is extended or adjusted under 35 U.S.C. 154(b) by 0 days.

(21) Appl. No.: 14/311,411

(22) Filed: Jun. 23, 2014

(65) Prior Publication Data

US 2020/0407968 A1   Dec. 31, 2020

(51) Int. Cl.
| | |
|---|---|
| *B60Q 7/00* | (2006.01) |
| *E04B 1/34* | (2006.01) |
| *E04B 1/343* | (2006.01) |
| *E04H 15/36* | (2006.01) |

(52) U.S. Cl.
CPC ........... *E04B 1/34384* (2013.01); *B60Q 7/00* (2013.01); *E04H 15/36* (2013.01)

(58) Field of Classification Search
CPC ....... E04B 1/34384; E04H 15/36; B60Q 7/00; B60Q 7/005
See application file for complete search history.

(56) References Cited

U.S. PATENT DOCUMENTS

| | | | | |
|---|---|---|---|---|
| 1,394,579 A * | 10/1921 | Isaacs | ...................... | E04H 15/06 135/88.14 |
| 2,887,234 A * | 5/1959 | Guyl | ...................... | G09F 17/00 211/189 |
| 3,936,967 A * | 2/1976 | Davis | ...................... | B60Q 7/005 40/592 |
| 4,519,409 A * | 5/1985 | Kinney | ................... | E04H 15/06 135/88.08 |
| 4,607,444 A * | 8/1986 | Foster | .................... | G09F 13/28 116/28 R |
| 4,719,935 A * | 1/1988 | Gustafson | ............... | E04H 15/10 135/124 |
| 5,158,103 A * | 10/1992 | Leu | ...................... | E04H 12/2238 135/114 |
| 5,295,500 A * | 3/1994 | Leu | ...................... | E04H 12/2238 135/114 |
| 6,357,510 B1 * | 3/2002 | Zheng | ..................... | A63B 9/00 135/143 |
| 6,402,220 B2 * | 6/2002 | Allen | ....................... | B60J 11/00 135/124 |
| 6,565,139 B2 * | 5/2003 | Bayerle | ................... | B60J 11/00 296/77.1 |
| 7,137,660 B2 * | 11/2006 | Weddington | ........... | A45B 23/00 296/105 |
| 7,404,372 B2 * | 7/2008 | Aasgaard | ................. | B60Q 1/52 116/28 R |

(Continued)

FOREIGN PATENT DOCUMENTS

GB   2497599 A *   6/2013   ............. E04H 6/005

*Primary Examiner* — Adriana Figueroa
(74) *Attorney, Agent, or Firm* — Grace J. Fishel

(57) ABSTRACT

There is provided a multi use traffic warning and shelter apparatus that includes a shelter volume delimiting component and an indicia component. The shelter volume delimiting component includes an arrangement for releasably securing the indicia component to the shelter volume delimiting component in a docked disposition of the indicia component.

10 Claims, 6 Drawing Sheets

(56) References Cited

U.S. PATENT DOCUMENTS

| | | | |
|---|---|---|---|
| 7,877,823 B2* | 2/2011 | Hentschel | B65F 1/1426 |
| | | | 4/476 |
| 8,185,979 B2* | 5/2012 | Hentschel | E04H 1/1216 |
| | | | 4/476 |
| 8,360,084 B1* | 1/2013 | Robinson | E04H 6/005 |
| | | | 135/133 |
| 9,038,298 B2* | 5/2015 | Bacik | E01F 9/65 |
| | | | 40/606.03 |
| 9,245,466 B2* | 1/2016 | Bacik | E01F 9/65 |
| 2002/0104242 A1* | 8/2002 | Haugen | G09F 23/02 |
| | | | 40/606.14 |
| 2004/0128888 A1* | 7/2004 | Payan | G09F 21/048 |
| | | | 40/610 |
| 2007/0119492 A1* | 5/2007 | Zheng | E04H 15/40 |
| | | | 135/126 |
| 2009/0084420 A1* | 4/2009 | Pelsue | E04H 15/48 |
| | | | 135/96 |

* cited by examiner

MULTI USE TRAFFIC WARNING AND SHELTER APPARATUS

BACKGROUND OF THE INVENTION

The present invention relates to a multi use traffic warning and shelter apparatus.

Triangular road hazard signs are well known and have been configured in numerous formats so as to be portable and easily stowed in a vehicle such as, for example, in the trunk of a car. Additionally, it is well known to provide such triangular road hazard signs with reflective materials to enhance their visibility and, furthermore, other arrangements have been proposed toward this end, including battery powered flashing lights mounted on the triangle perimeter or adjacent to the triangle.

Vehicle breakdowns or the occurrence of a condition that would make it unwise to continue further driving along a roadway are typical circumstances in which the vehicle operator parks the vehicle along the side of the roadway and deploys a triangular road hazard sign. Such vehicle breakdown circumstances often lead a vehicle operator to park the vehicle along the side of a roadway so that the vehicle operator can assess the cause of the breakdown, repair the vehicle part that failed, or stand by and wait for assistance. As a prudent measure, the vehicle operator desires to alert other motorists so that these other motorists can avoid a collision with the parked vehicle.

One type of vehicle breakdown is well known and often dreaded, as it involves the need to repair or replace a tire before the vehicle can proceed further. Tires are prone to damage from nails and other objects on a roadway. A flat tire must be replaced with a properly inflated tire before travel can resume regardless of the time of day. During daylight hours, changing a tire on the shoulder of a roadway is merely inconvenient, but during nighttime hours it is treacherous for two principal reasons. The first reason is that at night it is difficult to see clearly enough to ensure that the tire is replaced properly, and it usually takes longer to replace the tire than during daylight. The second reason is that it is more difficult for other drivers to see at night and thereby avoid a collision with a vehicle or person close to the roadway.

In addition to triangular road hazard signs, a number of approaches have been suggested for assisting a motor vehicle operator to provide a caution or warning to other motorists. Also, a number of approaches have been suggested for assisting the motor vehicle operator to assess, repair, or replace a failed vehicle part while the vehicle is parked along the side of a roadway. For example, U.S. Pat. No. 5,016,372 to Gold discloses a road service sign into which a car antennae is inserted. However, passing motorists may not see the small sign and fall to offer assistance. Furthermore, the sign cannot be securely attached to allow maximum visibility and is also susceptible to failure in adverse weather conditions.

As another example, U.S. Pat. No. 5,016,372 to Cole discloses a sign for stranded vehicles that has stiff rods on its perimeter thus preventing it from being folded or folded away for storage. The sign is thus limited in size because of the storage space needed and, additionally, the sign relies on hooks for attachment which makes for insufficient holding capability if the sign is buffeted by adverse weather. As a further example, U.S. Pat. Nos. 5,016,372. 5,398,437 to Bump, Jr. et al. discloses a banner like warning device that primarily uses magnets to attach the banner to a vehicle. However, some vehicles are non-metallic and will not accommodate the banner.

Thus, there remains a long standing and continuing need for improvements in the art that overcome the deficiencies of the known state of the art of motorist and road hazard warning products. Moreover, it would be desirable to provide an improved product that facilitates or enhances the ability of a motor vehicle operator to assess, repair, or replace a failed vehicle part while the vehicle is parked along the side of a roadway.

SUMMARY OF THE INVENTION

The present invention solves the above-mentioned problems by providing a multi use traffic warning and shelter apparatus.

It is one object of the present invention to provide a new and improved traffic warning apparatus that may be easily and efficiently manufactured.

It is a further object of the present invention to provide a new and improved shelter apparatus that is convenient to deploy and to carry.

According to one aspect of the present invention, there is provided a multi use traffic warning and shelter apparatus that includes a shelter volume delimiting component and an indicia component.

The shelter volume delimiting component, according to one feature of the one aspect of the apparatus of the present invention, has a docking location and the shelter volume delimiting component is disposable between a collapsed condition in which the shelter volume delimiting component delimits a nominal volume and a shelter providing condition in which the shelter volume delimiting component delimits a shelter volume that is greater than the nominal volume delimited by the shelter volume delimiting component in its collapsed condition. According to another feature of the of the one aspect of the present invention, the indica component has indicia and an anchor point, the indica component being selectively deployable between a docked disposition in which the anchor point of the indicia component is operably connected to the docking location of the shelter volume delimiting component and a remote disposition in which the anchor point of the indicia component is spaced from the docking location of the shelter volume delimiting component to a greater degree than it is when the indicia component is in the docked disposition, the indicia component including a display mounting structure for maintaining the indicia component in a display condition when the indicia component is in its remote disposition, wherein, in the display condition of the indicia component, the indicia on the indicia component can be seen, and the shelter volume delimiting component being operable to remain in its shelter providing condition when the indicia component is in its remote disposition.

According to further features of the one aspect of the present invention, the shelter volume delimiting component includes an arrangement for releasably securing the indicia component to the shelter volume delimiting component in the docked disposition of the indicia component.

BRIEF DESCRIPTION OF THE DRAWINGS

Other features and advantages of the invention will become apparent to those skilled in the art upon review of the following detailed description, claims, and drawings.

DETAILED DESCRIPTION OF AN EMBODIMENT

Figure 1:
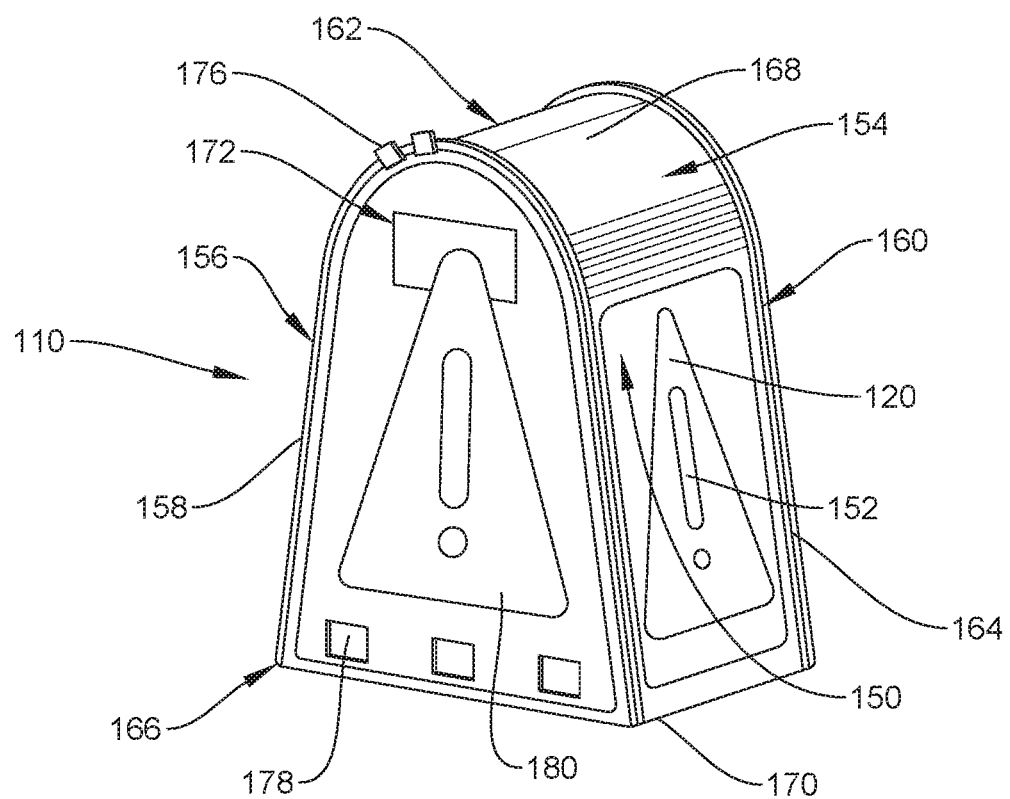
FIG. 1 is a top perspective view of one embodiment of the multi use traffic warning and shelter apparatus of the present invention.
Figures 2, 3:
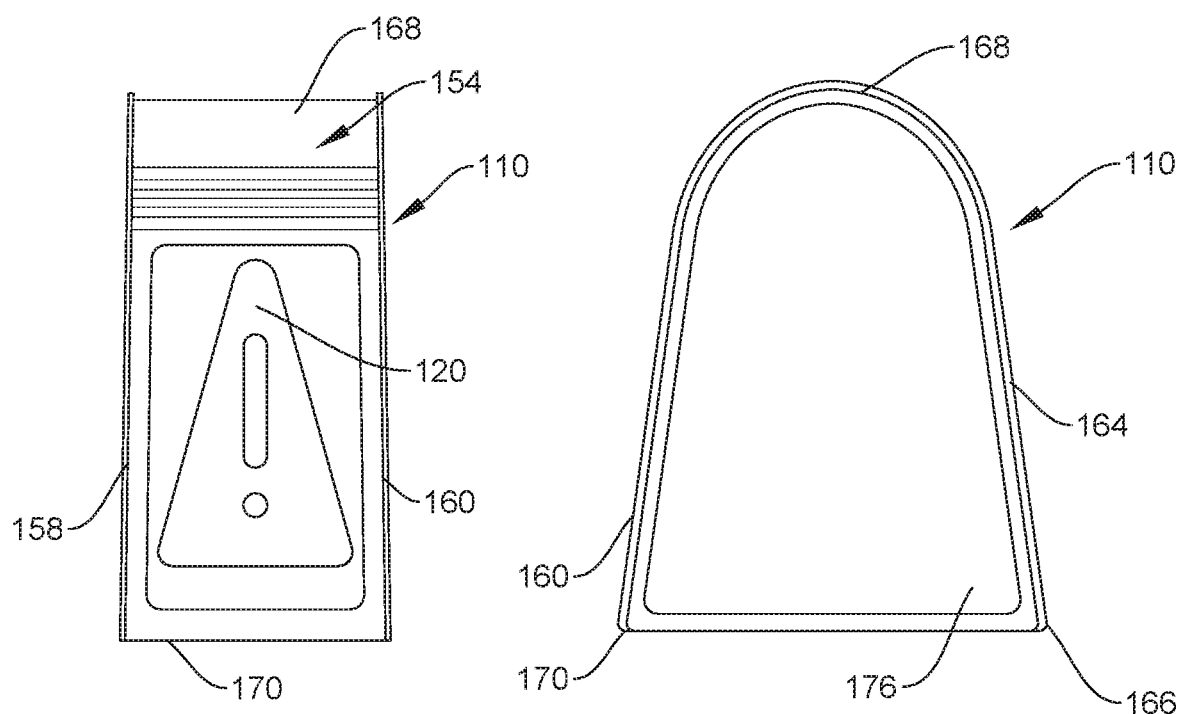
FIG. 2 is a side elevational view of the one embodiment of the multi use traffic warning and shelter apparatus of the present invention.
FIG. 3 is a front elevational view of the one embodiment of the multi use traffic warning and shelter apparatus of the present invention.
Figure 4:
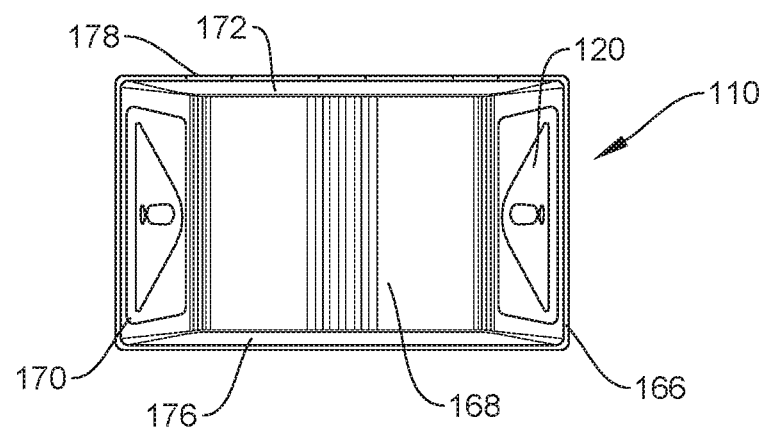
FIG. 4 is a top plan view of the one embodiment of the multi use traffic warning and shelter apparatus of the present invention.

As seen in FIG. 1, which is a top perspective view of one embodiment of the multi use traffic warning and shelter apparatus of the present invention, one embodiment of the multi use traffic warning and shelter apparatus of the present invention is illustrated and is generally designated as the combination shelter 110. The combination shelter 110 is formed of an indicia component 120 and a shelter volume delimiting component 150. Further views of the combination shelter can be seen in FIGS. 2-4, wherein FIG. 2 is a side elevational view of the one embodiment of the multi use traffic warning and shelter apparatus of the present invention, FIG. 3 is a front elevational view of the one embodiment of the multi use traffic warning and shelter apparatus of the present invention, and FIG. 4 is a top plan view of the one embodiment of the multi use traffic warning and shelter apparatus of the present invention.

Figure 8:
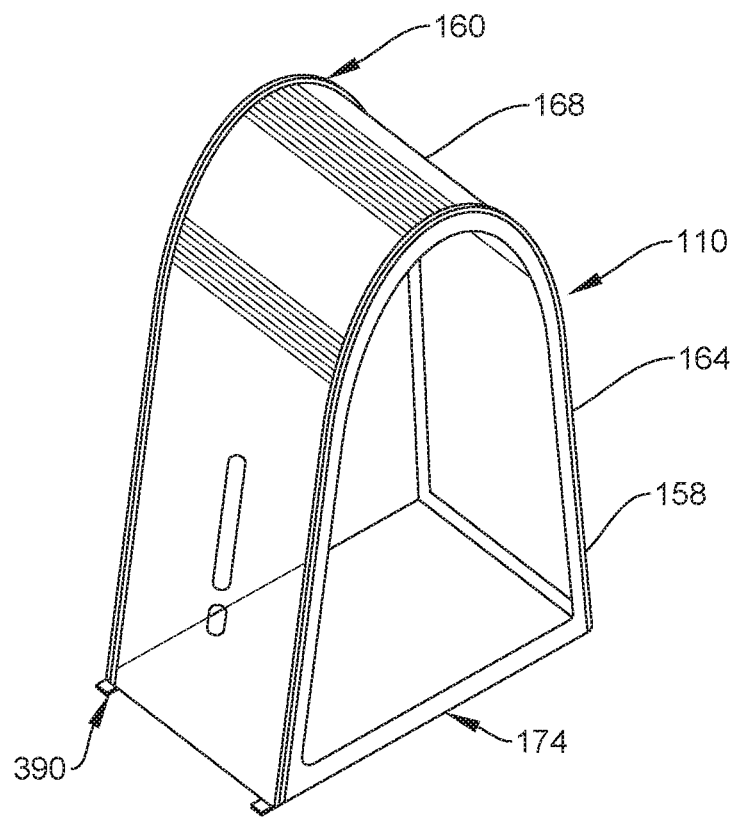
FIG. 8 is a top perspective view of the pole assembly of the one embodiment of the multi use traffic warning and shelter apparatus of the present invention shown in FIG. 1.

The shelter volume delimiting component 150 is exemplarily shown as a lightweight self standing tent, generally designated as the tent 152, and the tent 152 is configured with a barrier extent 154 substantially formed of a lightweight flexible fabric operatively draped on a pole assembly 156 having pole segments the deployment of which is assisted via resiliently biased cords. As seen in FIG. 8, which is a top perspective view of the pole assembly of the one embodiment of the multi use traffic warning and shelter apparatus of the present invention shown in FIG. 1, the pole assembly 156 has a first set of pole segments 158 operatively associated with one another in a manner such that this first set of pole segments forms an arch in the shelter providing condition of the combination shelter 110. Also, the pole assembly 156 has a second set of pole segments 160 operatively associated with one another in a manner such that this second set of pole segments forms an arch in the shelter providing condition of the combination shelter 110.

The barrier extent 154 includes an archway portion 162 having a pair of longitudinal edge throughways 164 each configured to receive a respective one of the first set of pole segments 158 and the second set of pole segments 160. Accordingly, when the combination shelter 110 is deployed in its shelter providing condition, the first set of pole segments 158 and the second set of pole segments 160 each forms an arch with the midpoint of the arch radius delimiting the tallest portion of the arch, as viewed in a height direction, and the lower ends of each arch being spaced from one another in a lateral direction perpendicular to the height direction. Additionally, the first set of pole segments 158 and the second set of pole segments 160 are spaced from one another in a thickness direction perpendicular to the height direction and the lateral direction to an extent such that the archway portion 162 of the barrier extent 154 extends in a relatively taut manner between the first set of pole segments 158 and the second set of pole segments 160 and the barrier element 154 itself forms an arch that extends from a lower edge 166, through a curved roof region 168, to an opposite lower edge 170.

The height of the overall archway delimited by the first set of pole segments 158 and the second set of pole segments 160 and the archway portion 162 of the barrier extent 154 when these are all deployed in their arch forming dispositions can be specifically configured relative to a particular deployment situation such that the personal comfort of the user, including protection from wet and dry weather elements, and accessibility to a vehicle repair location are optimized. For example, it may be desirable that the overall archway has a height, width, and lateral extent such that a person can position the combination shelter 110 adjacent a vehicle tire that is to be assessed, repaired, or replaced with the person having sufficient headroom clearance to stand erect in the shelter delimiting volume of the combination shelter 110, or the combination shelter 110 having sufficient room to shelter any tools or repair items from wet weather.

Figure 9:
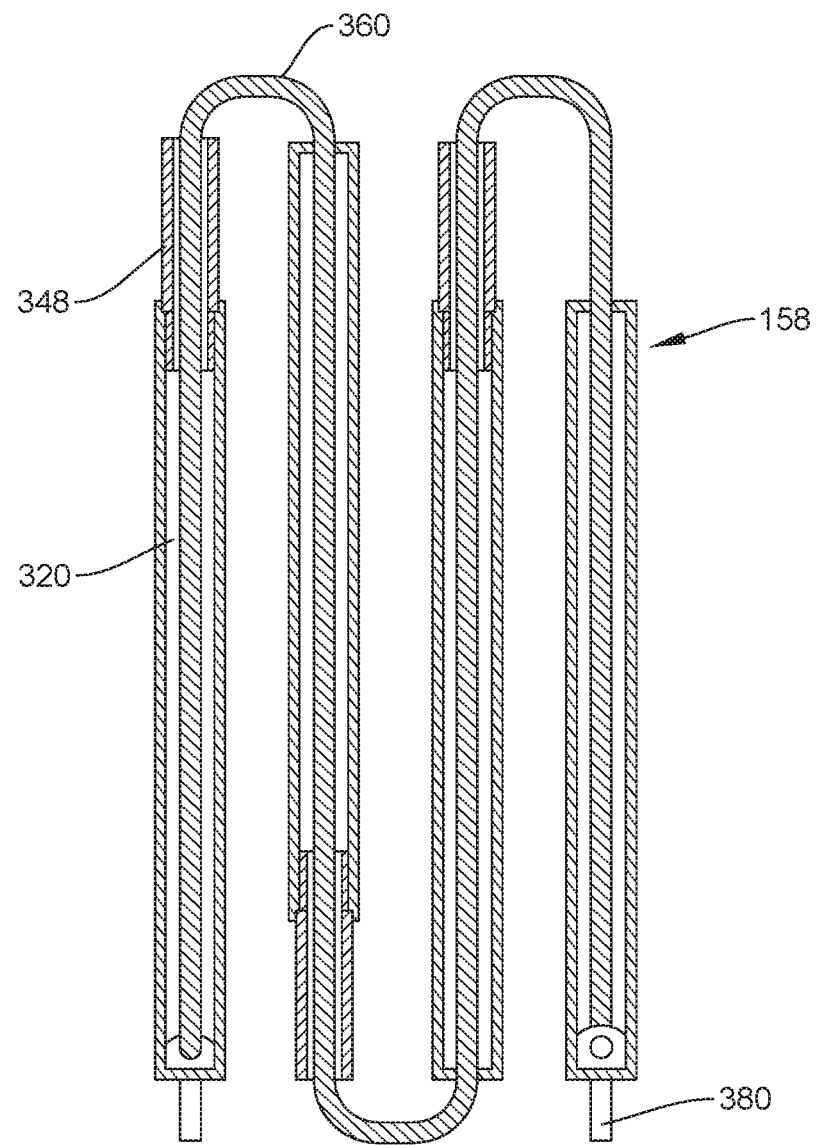
FIG. 9 is a front elevational view of the first set of pole segments in a disassembled condition.

The first set of pole segments 158 and the second set of pole segments 160 are each configured as a spring-corded pole assembly that facilitates aligning and assembly the respective pole segments to each other—i.e., each includes resiliently biased cords. As seen in FIG. 9, which is a front elevational view of the first set of pole segments in a disassembled condition, each pole segment has a hollow interior long portion 320 and a hollow interior short portion 340 that is fixedly secured to one end of the long portion 320. A spring cord 360 has one end secured to an insert peg 380 fixedly secured to a respective end-forming one of the pole segments and has an opposite end secured to an insert peg 380 fixedly secured to a respective end-forming one of the pole segments, whereupon the spring cord 360 extends through the hollow interiors of the long portion 320 and the short portion 340 of each pole segment. The spring cord 360 is a resiliently biased cord in that it can be extended against its organic resilient bias from its nominal length and will seek to return to its nominal length once the extension force ceases.

In the disassembled condition of the first set of pole segments 158 as shown in FIG. 9, each of the pole segments 158 can be nested adjacent another pole segment for compact and convenient storage of the pole segments. The length of the spring cord 360 is selected such that the spring cord resiliently extends from its nominal (less extended) position to a greater extension length to thereby permit the pole segments 158 to be nested adjacent one another. When a user desires to assemble the first set of pole segments 158, the user inserts the short portion 340 of each pole segment into the hollow interior of the long portion 320 of an adjacent pole segment and the spring cord 360 resiliently contracts as it seeks to return to its nominal (less extended) position, whereby this continuously acting return force urges the pole segments 158 to remain in their coupled together condition. As seen in FIG. 8, once the pole segments 158 are fully assembled into their coupled together condition or, alternatively, as the pole segments 158 are successively placed into their coupled together condition, the now-coupled pole segments can be threaded through the longitudinal edge throughways 164 of the archway portion 162 of the barrier element 154. Each of the insert pegs 380 can be inserted through a respective grommet 390 secured to the barrier element 154 adjacent its lower edge 166 such that the pole segments 158 are constrained by the barrier element 154 to remain in their arch forming dispositions.

Figures 5, 6:
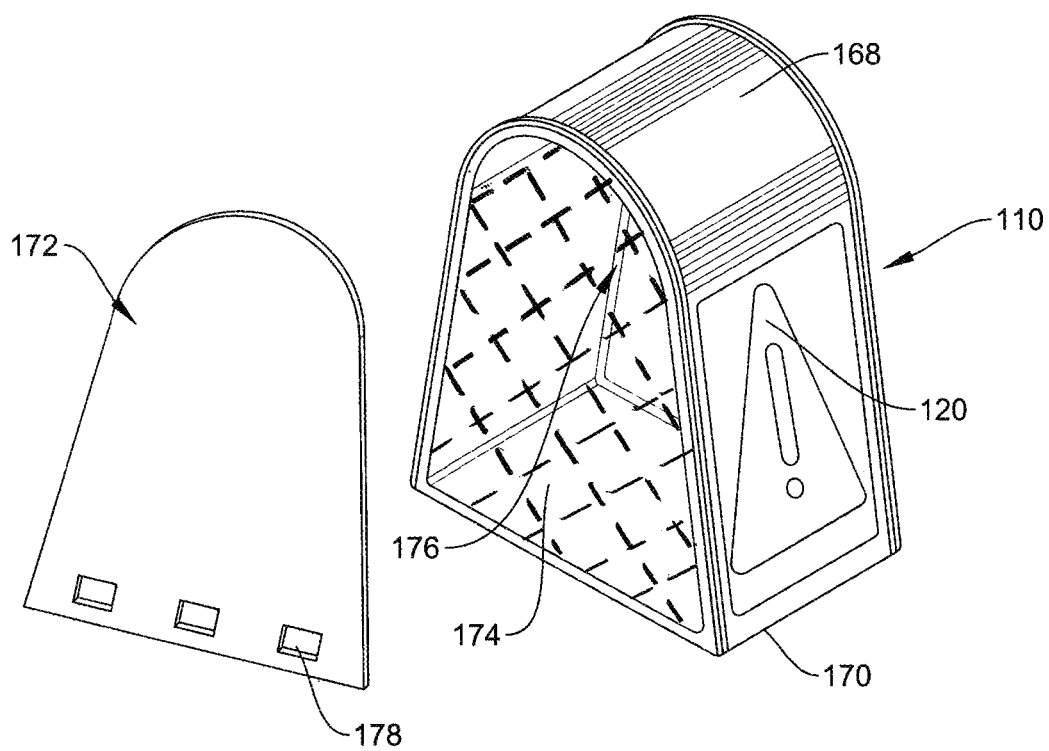
FIG. 5 is a top perspective of the backwall portion of the one embodiment of the multi use traffic warning and shelter apparatus of the present invention shown in FIG. 1.
FIG. 6 is a top perspective view of the one embodiment of the multi use traffic warning and shelter apparatus of the present invention shown in FIG. 1 with the backwall portion of the barrier extent not being shown.

As further seen in FIG. 1, the barrier extent 154 also includes a backwall portion 172. The backwall portion 172 can be seen in more detail in FIG. 5, which is a top perspective of the backwall portion, and the backwall portion 172 is configured to be removably secured to the barrier extent 154, as will be described in more detail herein. The barrier extent 154 also includes, as seen in FIG. 6, which is a top perspective view of the one embodiment of the multi use traffic warning and shelter apparatus of the present invention shown in FIG. 1 with the backwall portion of the barrier extent not being shown, a floorway portion 174 having a pair of linear edges each connected to a respective lower edge 166, 168 of the archway portion of the barrier extent 154. The barrier extent 154 further includes a front side portion 176. The floorway portion 174 is thus configured to extend in a generally planar manner when the first set of pole segments 158 and the second set of pole segments 160 and the archway portion 162 of the barrier extent 154 are deployed in their arch delimiting dispositions, whereupon the floorway portion 174 forms an elements resistant surface on which a person can stand or sit or on which an item such as, for example, a replacement or spare tire, can be placed.

The archway portion 162 and the floorway portion 174 of the barrier extent 154 are sufficiently resiliently flexible to permit the first set of pole segments 158 and the second set of pole segments 160 to be disposed closely adjacent to one another in the collapsed condition of the combination shelter 110, thereby substantially reducing the width of the combination shelter 110 as compared to its width in its shelter providing condition. Moreover, in dependence upon the particular configuration of the first set of pole segments 158 and the second set of pole segments 160, these pole segments can be configured to be reversibly inserted into, or retracted from, the longitudinal edge throughways 164 of the archway portion of the barrier extent. With such a configuration, it would then be possible for a user to retract the pole segments from the longitudinal edge throughways 164 of the archway portion 162 of the barrier extent 154 and thereafter break down or reduce the pole segments into individual lengths while remaining interconnected via a resiliently biased cord arrangement such as has been described with reference to FIGS. 8 and 9, it can be seen that such an arrangement permits the combination shelter 110 to be reduced to a substantially much smaller footprint in its collapsed condition as opposed to its shelter providing condition, thereby facilitating the storage of the combination shelter 110 in a vehicle and maximizing the number of potential vehicle storage locations.

With reference now to further details of the backwall portion 172, the backwall portion 172 is advantageously configured to serve as the indicia component 120 or as one of the components of the indicia component 120. This backwall portion 172 is formed of a lightweight flexible fabric and has a perimeter compatibly configured with respect to the overall arch such that one continuous edge of the backwall portion 172 tracks the arch shape of the first set of pole segments 158 and a lower edge of the backwall portion 172 tracks a linear back edge of the flooring portion 174 of the barrier extent 154. As seen in FIG. 5, the backwall portion 172 of the barrier extent 154 is provided with a suitable reversible attachment and detachment arrangement in the form, for example, of a plurality of hook-and-loop fastener units 176 each having a hook region and a loop region with the hook region and the loop region being disposable around an uncovered area of the first set of pole segments 158 in the vicinity of the archway portion 162 of the barrier element 154 and operable to releasably engage one another. This releasable engagement arrangement permits the backwall portion 172 of the barrier extent 154 to be detachably secured to the archway portion 162 of the barrier extent 154 and to hang therefrom in a vertical disposition so that the backwall portion 172 is thus in a position in which it deflects the penetration of weather elements or road debris into the shelter delimiting volume of the combination shelter 110 as the combination shelter 110 is deployed at, for example, a vehicle repair site.

Additionally, the backwall portion 172 includes a plurality of spaced magnets 178 each secured in a sewn in fabric pocket adjacent the lower edge of the backwall portion 172 that tracks a linear back edge of the flooring portion 174 of the barrier extent 154. These magnets 178 are operable to releasably magnetically engage magnetic attracting surfaces of a vehicle such as, for example, the trunk lid of a car, so that the backwall portion 172 and any warning indicia thereon can be readily visible to motorists who are driving their vehicles along the roadway.

The advantages of the attachment/detachment capability of the backwall portion 172 of the barrier extent 154 can be understood when it is seen that the backwall portion 172 is provided with a display selection of safety indicia such as, for example, a triangle 180 formed of a soft fabric reflective material. When the backwall portion of the barrier extent is detached from the remainder of the barrier extent, the user can then deploy the backwall portion 172 to function as the indicia component 120 in that the user can deploy the backwall portion to, for example, be draped on the back side of the vehicle so that the reflective warning triangle 180 is then visible to approaching motorists on the roadway. Moreover, the indicia component 120 can include a separate rigid support assembly continuously connected to the backwall portion or connectable to the backwall portion when the backwall portion is detached for deployment in its role as a component of the indicia component 120, whereupon the rigid support assembly can operate as a stand alone support that the user can place at a spacing from the vehicle to thereby provide suitable lead time warning to approaching motorists that the user's vehicle is parked adjacent the roadway.

It can thus be understood that the backwall portion, 172 is an indicia component having indicia in the form of a reflective warning triangle 180 and also having an anchor point in the form of the hook-and-loop fastener units 178, Also, it can be understood that the backwall portion 172 in its function as an indicia component is selectively deployable between a docked disposition in which the anchor point of the indicia component (the hook-and-loop fastener units 176) is operably connected to the docking location of the shelter volume delimiting component (i.e., the opening delimited by the combination shelter 110 at which the backwall portion 172 is suspended) and a remote disposition in which the anchor point of the indicia component (the hook-and-loop fastener units 176) is spaced from the docking location of the shelter volume delimiting component to a greater degree than it is when the indicia component is in the docked disposition. Also, it can be understood that the backwall portion 172 in its function as an indicia component includes a display mounting structure in the form of the plurality of spaced magnets 178 for maintaining the indicia component in a display condition when the indicia component is in its remote disposition, wherein, in the display condition of the indicia component, the indicia in the form of a reflective warning triangle on the indicia component can be seen, and that the shelter volume delimiting component is operable to remain in its shelter providing condition when the indicia component is in its remote disposition.

As a variation, the barrier extent 154 can also include a stay behind covering (shown in broken lines in FIG. 6) that is compatibly configured with the backwall portion 172 and is permanently or detachably secured to the backside region of the combination shelter 110. The backwall portion 172 with the reflective warning triangle thereon can be sized relative to this stay behind portion such that the backwall portion with the reflective warning triangle thereon overlays the stay behind covering when the backwall portion 172 is attached to the remainder of the barrier extent. With such an arrangement, the backwall portion and the stay behind covering of the barrier extent 154 together provide a double wall protection against weather elements and road debris when both of these portions are secured to the remainder of the barrier extent 154. Alternatively, in the event that the backwall portion 172 with the reflective warning triangle thereon is detached from the shelter volume delimiting component and then deployed in its role with the indicia component 120, the stay behind covering remains in place at the backside region of the combination shelter 110 and continues to provide protection against weather elements and roadside debris while the backwall portion 172 with the reflective warning triangle thereon can be deployed to warn other motorists.

Figure 7:
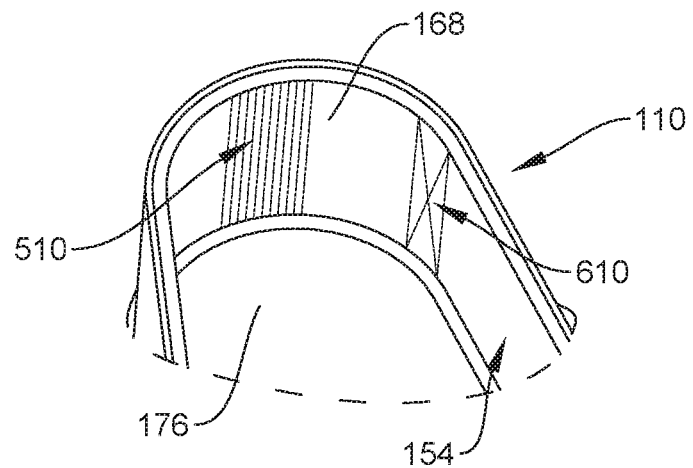
FIG. 7 is a bottom perspective view of the archway portion of the barrier element of the one embodiment of the multi use traffic warning and shelter apparatus of the present invention shown in FIG. 1 and showing overhead illumination lights.

Reference is now had to FIG. 7, which is a bottom perspective view of the archway portion of the barrier element of the one embodiment of the multi use traffic warning and shelter apparatus of the present invention shown in FIG. 1 and showing overhead illumination lights 510. The light source of the overhead illumination lights 510 can be in the form of elongate tubular light emitting diodes (LEDs) that extend laterally on, and are secured to, the underside of the archway portion 162 of the barrier element 154. The overhead illumination lights 510 can be powered, for example, via single use or rechargeable batteries (not shown) supported on the barrier element 154. The overhead illumination lights 510 can have an illumination power sufficient to provide assistance lighting to a person occupying the combination shelter 110. Additionally, the overhead illumination lights 510, if appropriately orientated to be visible externally of the combination shelter 110, can augment the visibility of the combination shelter. It can be additionally seen in FIG. 7 that the combination shelter 110 includes a fabric pocket 610 that can, for example, temporarily store lug nuts removed from a vehicle tire during a tire change operation.

The combination shelter 110 includes a frontside region that is opposite to the backside region and this frontside region can be a covered region (covered by the frontwall portion 176) or a region that can be optionally covered with a selectively retractable covering. In each instance, in the circumstances in which the frontside region is in an uncovered status, a user can dispose the combination shelter 110 closely adjacent to a vehicle repair site, such as, for example, adjacent a vehicle tire to be repaired or removed, with the uncovered frontside region in facing relationship to the vehicle, and the user can then perform repair tasks and other tasks with ready access to the vehicle while being sheltered from weather elements and road debris by the shelter volume delimiting component.

Another variation of the combination shelter 110 could include the placement of different fabric materials at selected locations on the shelter volume delimiting component in lieu of other more impermeable fabric materials. For example, a mesh fabric material can be located at a mid-height region of the archway portion of the barrier extent to promote the flow of ventilating air into and through the combination shelter 110. Also, the combination shelter 110 can be provided with dedicated warning indicia such as, for example, a reflective warning triangle, that is permanently secured to the combination shelter 110 and that augments any other motorist warning efforts such as, for example, any motorist warning effort afforded by the backwall portion of the barrier extent deployed in its dual role as a component of the indicia component 120.

Figure 10:
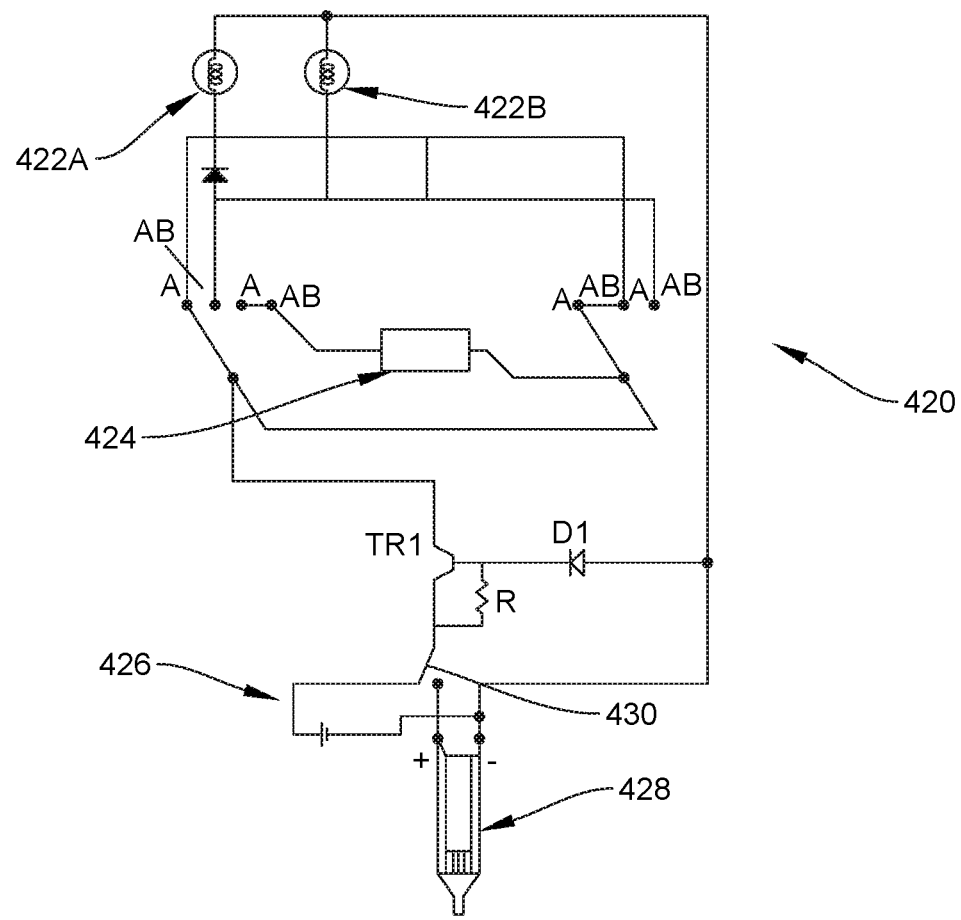
FIG. 10 is a schematic plan view of an exemplary power arrangement for providing illumination energy for the indicia displayed on the indicia component.
Figure 11:
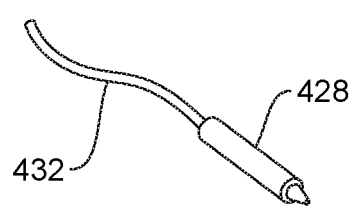
FIG. 11, which is a top perspective view of the car jack compatible contact tube of the exemplary power arrangement shown in FIG. 10.

Reference is now had to FIG. 10, which is a schematic plan view of an exemplary power arrangement for providing illumination energy for the indicia displayed on the indicia component. A circuit 420 includes a pair of lamps 422A and 422B both of which are operatively connected to a relay 424 that is operable to control the supply of electricity to the lamps 422A and 422B, via a toggle arrangement, such that the lamps are both continuously energized (constant illumination or are alternatively energized (blinking mode). A Zener diode stabilizes the voltage transmitted to the lamps 422A and 422B. A direct current (D.C.) adapter 426 includes a car jack compatible contact tube 428 and is coupled to a power source selector 430 that is operable to permit or prevent the flow of electrical current to the relay 424. As seen in FIG. 11, which is a top perspective view of the car jack compatible contact tube of the exemplary power arrangement shown in FIG. 10, the car jack compatible contact tube 428 can be provided with a cable 432 that extends for several feet so that the indicia component 120 can be supplied with power while at a remote location from a vehicle. Although this invention has been disclosed and described in its preferred forms with a certain degree of particularity, it is to be realized that the optimum dimensional relationships for the parts of the invention, to include variations in size, materials, shape, form, function and manner of operation, assembly and use, are deemed readily apparent and obvious to one skilled in the art. Additionally, it is understood that the present disclosure of the preferred forms is only by way of example and that numerous changes in the details of operation and in the combination and arrangement of parts may be resorted to without departing from the spirit and scope of the invention as hereinafter claimed.

What is claimed is:

1. A multi use traffic warning and shelter apparatus comprising:

a shelter volume delimiting component, the shelter volume delimiting component having a docking location and the shelter volume delimiting component being disposed between a collapsed condition in which the shelter volume delimiting component delimits a nominal volume and a shelter providing condition in which the shelter volume delimiting component delimits a shelter volume that is greater than the nominal volume delimited by the shelter volume delimiting component in its collapsed condition; and an indicia component, the indicia component having indicia and an anchor point, the indicia component being selectively deployable between a docket disposition in which the anchor point of the indicia component is operable connected to the docking location of the shelter volume delimiting component and a remote disposition in which the anchor point of the indicia component is spaced from the docking location of the shelter volume delimiting component to a greater degree than it is when the indicia component is in the docketed disposition, a stay behind covering which is secured to the shelter volume delimiting component underlying the indicia component and configured to remain in place when the indicia component is in its remote disposition, the indicia component including a display mounting structure for maintaining the indicia component in a display condition when the indicia component is in its remote disposition, wherein, in the display condition of the indicia component, the indicia on the indicia component can be seen, and the shelter volume delimiting components being operable to remain in its shelter providing condition when the indicia component is in its remote disposition; and, a light source attached to the Indicia component and including a car jack compatible contact tube for powering the light from a vehicle through a D.C. adapter.

2. The multi use traffic warning and shelter apparatus according to claim 1 wherein the indicia component forms an elements deterrent surface of the shelter volume delimiting component when the indicia component is deployed in its docket disposition whereby the indicia component deters the encroachment of outside elements such as water, mud, debris into the shelter volume delimiting component.

3. The multi use traffic warning and shelter apparatus according to claim 2 wherein at least one of the indicia component and the shelter volume delimiting component includes an arrangement for releasably securing the indicia component to the shelter volume delimiting component in the docked disposition of the indicia component.

4. The multi use traffic warning and shelter apparatus according to claim 3 wherein the arrangement for releasably securing the indicia component to the shelter volume delimiting component in the docked disposition of the indicia component includes at least one magnetized surface on a respective one of the indicia component and the shelter volume delimiting component and a magnetic sensitive surface on the other of the indicia component and the shelter volume delimiting component.

5. The multi use traffic warning and shelter apparatus according to claim 4 wherein the shelter volume delimiting component includes a barrier extent and a pole assembly, the barrier extent being couplable to the pole assembly at least in the shelter providing condition of the shelter volume delimiting component and the pole assembly having sufficient rigidity in the shelter providing condition of the shelter volume delimiting component to maintain the barrier extent in a position for resisting the intrusion of outside elements into the shelter volume.

6. The multi use traffic warning and shelter apparatus according to clam 5 wherein the pole assembly includes a pair of pole segments and a resilienly biased cord operatively connected to the pair of pole segments.

7. The multi use traffic warning and shelter apparatus according to claim 6 wherein the indicia component includes reflective material.

8. The multi use traffic warning and shelter apparatus according to claim 6 wherein the display mounting structure of the indicia component includes a vehicle engagement surface operable to engage a surface of a vehicle in an engagement mode that promotes a stable positioning of the indicia component relative to the vehicle.

9. The multi use traffic warning and shelter apparatus according to claim 8 wherein the vehicle engagement surface of the indicia component includes a magnetized member operable to exert a magnetic attraction force on a metallic vehicle surface.

10. The multi use traffic warning and shelter apparatus according to claim 1 wherein a light source is in a curved roof region of the shelter volume delimiting component.

* * * * *